United States Patent [19]

Nakayama et al.

[11] Patent Number: 4,695,134
[45] Date of Patent: Sep. 22, 1987

[54] COMPACT PHOTOGRAPHIC LENS

[75] Inventors: Hiroki Nakayama; Yasuhisa Sato, both of Kanagawa; Yasuyuki Yamada, Tokyo, all of Japan

[73] Assignee: Canon Kabushiki Kaisha, Tokyo, Japan

[21] Appl. No.: 678,222

[22] Filed: Dec. 5, 1984

[30] Foreign Application Priority Data

Dec. 6, 1983 [JP] Japan ................... 58-230268

[51] Int. Cl.$^4$ .................. G02B 13/18; G02B 9/34
[52] U.S. Cl. ................... 350/432; 350/449; 350/469
[58] Field of Search ............ 350/432, 449, 469, 473, 350/464, 465

[56] References Cited

U.S. PATENT DOCUMENTS

| | | | |
|---|---|---|---|
| 1,077,420 | 11/1913 | Minor | 350/469 X |
| 4,124,276 | 11/1978 | Okano et al. | 350/469 X |
| 4,368,956 | 1/1983 | Yamada et al. | 350/469 X |
| 4,477,155 | 10/1984 | Sato et al. | 350/469 |
| 4,521,084 | 6/1985 | Kurihara | 350/469 X |
| 4,596,447 | 6/1986 | Yamada et al. | 350/469 X |

Primary Examiner—John K. Corbin
Assistant Examiner—Scott J. Sugarman
Attorney, Agent, or Firm—Toren, McGeady & Associates

[57] ABSTRACT

The disclosed compact photographic lens includes, from front to rear, a positive meniscus-shaped first lens unit convex toward the front, a negative aspheric second lens unit concave toward the front, a bi-concave third lens unit, and a negative fourth lens unit with its front surface concave toward the front. The lens satisfies the following conditions:

$$-3.5 < r3/f < -2.0$$

$$-1.8 < r7/f < -0.5$$

$$1.4 < r8/f < 6.5$$

$$0 < d6/f < 0.017$$

where f is the focal length of the entire system, r3 is the paraxial radius of curvature of the front surface of the third lens unit, r7 and r8 are the radii of curvature of the front and rear surfaces of the fourth lens unit respectively, and d6 is the axial air separation between the third and fourth lens units when focused to infinity.

10 Claims, 6 Drawing Figures

COMPACT PHOTOGRAPHIC LENS

BACKGROUND OF THE INVENTION

1. Field of the Invention

This invention relates to compact wide angle photographic lenses.

2. Description of the Prior Art

In the art of photographic lenses for behind the shutter type of cameras, many proposals have been made to achieve compatibility between wide angle and compactness. However, conventional photographic lenses generally have telephoto ratios greater than 1.1. Japanese Laid-Open Patent Application No. SHO 53-97824 has achieved reduction of the telephoto ratio in a photographic lens to 1.06, but gives an image angle of 64°–68° with as slow a speed as F/3.5. If this lens is applied to behind the shutter type cameras, the image angle becomes somewhat excessive toward wide angles, and the speed is not sufficiently fast.

SUMMARY OF THE INVENTION

An object of the present invention is to provide a fast wide angle photographic lens.

Another object is to provide a photographic lens of reduced telephoto ratio with good image quality.

Still another object is to correct deterioration of image quality when focusing is effected down to shorter object distances.

To accomplish the aforesaid objects, the lens is constructed with, from front to rear, a positive meniscus-shaped first lens unit of forward convexity, a negative second lens unit with its front surface concave toward the front, a positive third lens unit with its rear surface convex toward the rear, and a negative fourth lens unit with its front surface concave toward the front, satisfying the following conditions:

$$-3.5 < r3/f < -2.0 \quad (1)$$

$$-1.8 < r7/f < -0.5 \quad (2)$$

$$1.4 < r8/f < 6.5 \quad (3)$$

$$0 < d6/f < 0.017 \quad (4)$$

where
- f: the focal length of the entire system;
- r3: the radius of curvature of the paraxial region of the front surface of the third lens unit;
- r7 and r8: the radii of curvature of the front and rear surfaces of the fourth lens unit respectively; and
- d6: the axial air separation between the third and fourth lens units when focused to infinity.

DETAILED DESCRIPTION OF THE PREFERRED EMBODIMENTS

Figure 1:
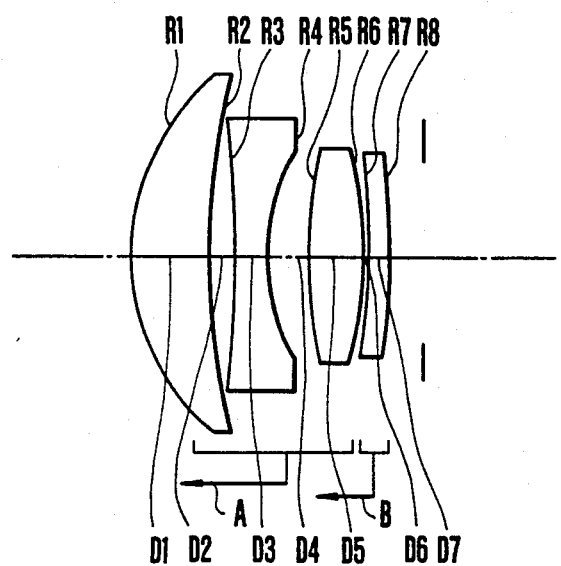
FIG. 1 is a longitudinal section view of an embodiment of a lens according to the invention.
Figure 4:
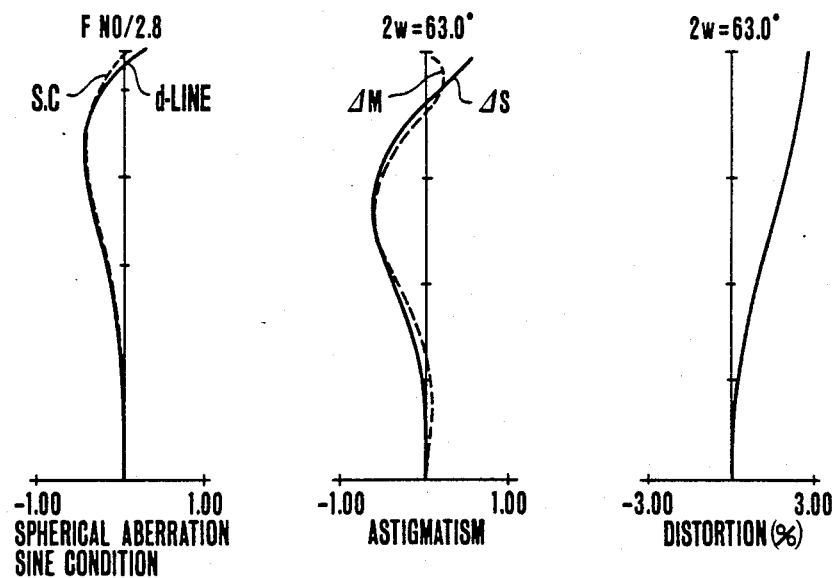
FIG. 4 is a graphic representation of the aberrations of a third specific lens with the object at infinity.
Figure 2A:
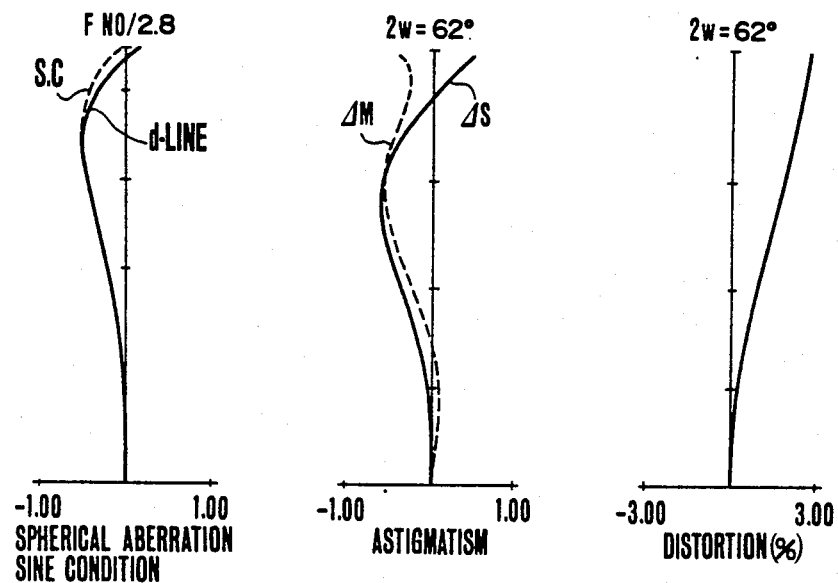
FIGS. 2A and 2B are graphic representations of the aberrations of a first specific lens with the object at infinity and at a distance of 55.6 f from the image plane respectively.
Figure 2B:
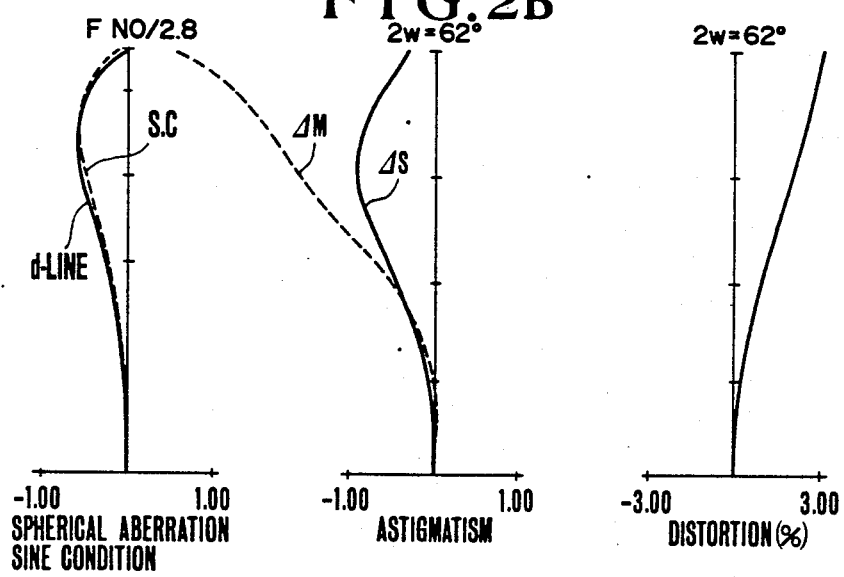
Figure 3A:
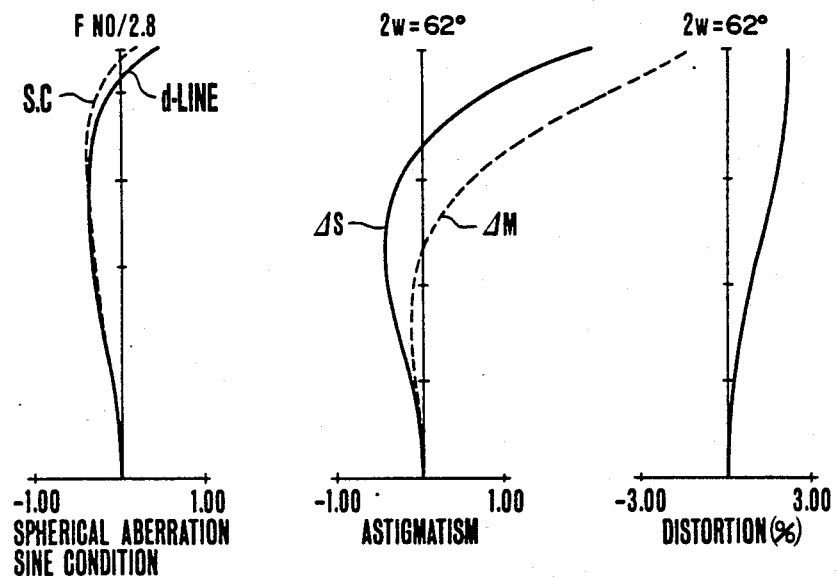
FIGS. 3A and 3B are graphic representations of the aberrations of a second specific lens with the object at infinity and at a distance of 55.6 f from the image plane respectively.
Figure 3B:
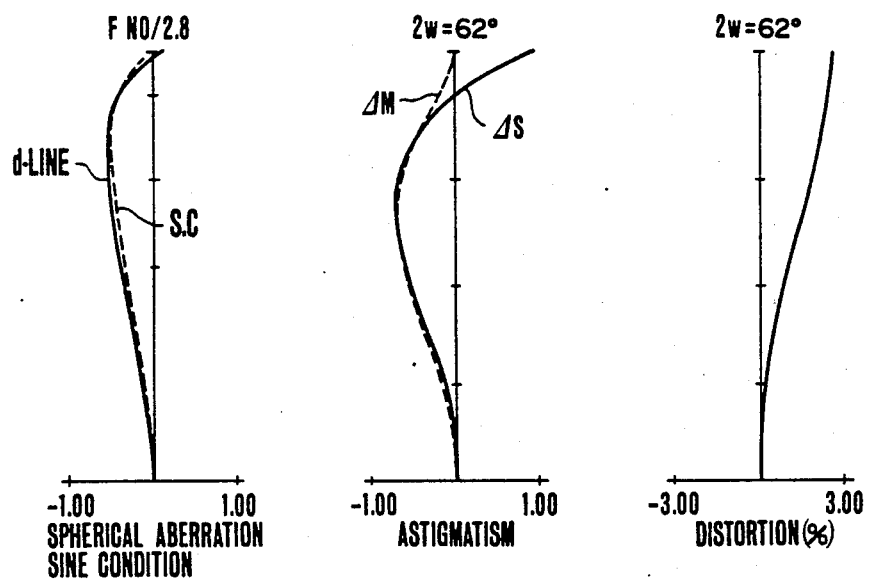

FIG. 1 shows the general configuration of the wide angle photographic lens according to the invention. The numerical data of the specific embodiments will be described later. The lens is constructed of, from front to rear, a meniscus positive lens, convex toward the front, a bi-concave lens, a bi-convex lens, and a negative lens with its front surface concave toward the front, one of the second to the fourth surfaces being made aspheric. This photographic lens while satisfying the above-stated conditions (1) to (4), is provided with an aspherical surface preferably at the front surface of the second lens to contribute to a good correction of aberrations. To figure the aspheric surface, let us consider a system of coordinates with its X-axis in the optical axis of the lens and its Y-axis in a direction perpendicular to the optical axis. The direction in which light advances is taken as positive and the original point is taken at the intersection of the vertex of the lens and the X-axis. An equation for the difference $\Delta X$ between the aspherical surface and a reference spherical surface is obtained in the form of the following expanding polynomial.

$$\Delta X = \frac{(1/r3^*)Y^2}{1 + \sqrt{1 - (Y/r3^*)^2}} + a1Y^2 + a2Y^4 + a3Y^6 + \ldots +$$

$$b1Y^3 + b2Y^5 + b3Y^7 - \frac{(1/r3)Y^2}{1 + \sqrt{1 - (Y/r3)^2}}$$

where ai and bi are the even and odd aspherical coefficients respectively. The radius of curvature r3 of the paraxial region of the aspheric surface and the radius of curvature r3* of the reference spherical surface are related by $$r3 = \frac{1}{\frac{1}{r3^*} + 2a1}$$

Letting E3 denote a half of the effective diameter of the front surface of the second lens, $\Delta X[0.7]$ the value of $\Delta X$ at a height of 0.7E3 in the Y-axis, and $\Delta X[0.5]$ the value of $\Delta X$ at a height of 0.5E3 in the Y-axis, the following conditions are satisfied.

$$-5.5 \times 10^{-4} < \frac{\Delta X[0.7]}{f} < -1.0 \times 10^{-4} \quad (5)$$

$$-5.5 \times 10^{-4} < \frac{\Delta X[0.5]}{f} < -0.8 \times 10^{-4} \quad (6)$$

Conditions (1) to (6) relate to the correction of aberrations, particularly, coma, halo, curvature of field and spherical aberration.

When the lower limit of condition (1) is exceeded, outward coma is increased, and field curvature is also deteriorated badly in the negative direction. When the upper limit of condition (1) is exceeded, strong positive halo due to the marginal rays is increased in the intermediate zone on the image field, inward coma in the marginal zone is also increased, spherical aberration is also deteriorated badly in the positive direction, and field curvature is also deteriorated badly in the negative direction. When the lower limit of condition (2) is exceeded, outward coma is increased, and spherical aberration is also deteriorated badly in the negative direction. When the upper limit of condition (2) is exceeded, strong inward coma is increased, spherical aberration is also deteriorated badly in the positive direction and field curvature is also deteriorated badly in the negative direction. When the lower limit of condition (3) is exceeded, strong positive halo due to the marginal rays is increased, and field curvature is also deteriorated badly in the positive direction. When the upper limit of condition (3) is exceeded, strong negative halo due to the marginal rays is increased, and field curvature is also deteriorated badly in the negative direction. When the upper limit of condition (4) is exceeded, outward coma is increased in the marginal zone, and field curvature is produced in the negative direction.

Also, when the lower limits of conditions (5) and (6) are exceeded, inward coma due to the marginal rays is increased, and spherical aberration is also deteriorated badly in the positive direction. When the upper limits of conditions (5) and (6) are exceeded, outward coma due to the marginal rays is increased, and, even in the marginal zones, negative halo due to the marginal rays is increased, and the spherical aberration is also deteriorated badly in the negative direction. Conditions (5) and (6) correct deterioration of aberrations due to those rays of the off-axial light flux incident on the front surface of the second lens unit which pass at farther points from the optical axis.

To attain an improvement in aberration correction, conditions (1) to (4), and further (5) and (6) are important.

By the way, in such compact photographic lenses for use with the behind-shutter type cameras, if the focusing method of bodily moving the lens is employed, the aberrations can be stabilized until the object distance is somewhat shorter. But for considerably near objects, it does not allow the light flux to pass through the center of the pupil. To solve this, an increase in the diameter of the front lens members may be considered. However, it is not advantageous, because the off-axial light flux increases, and the inward coma and halo are intensified. Alos, the increase of the outer diameter of the lens implies that the compactness is decreased.

To overcome the above-described drawbacks without increasing the diameter of the front lens members, the condition to be satisfied is that as focusing is performed from infinity to a minimum object distance, the first, second and third lens units are axially moved forward as a unit A, while the fourth lens unit is axially moved forward but at a slower speed than the first to third lens units (FIG. 1). Another usable method is that until down to a certain object distance, the first, second, third and fourth lens units are axially moved forward in unison. As focusing is effected further down from that certain object distance, the first, second and third lens units continue to move forward, while the fourth lens unit either remains stationary, or moves forward at a slower speed than the first, second and third lens units.

Three examples of specific lenses of the invention can be constructed in accordance with the numerical data given in the following tables for the radii of curvature, R, the axial thickness and air separations, D, the refractive indices and Abbe numbers of the lens elements with the subscripts numbered consecutively from front to rear, the aspherical even coefficients, ai, and the aspherical odd coefficients, bi.

Examples 1 and 2 employ the focusing method of a different speed between the axial forward movements of the first, second and third lens units and of the fourth lens unit in a ratio of 1:0.7. Example 3 employs the method of moving all the lens units in unison throughout the entire focusing range.

EXAMPLE 1

| | F = 100 | FNO = 1:2.8 | 2W = 62.0° | |
|---|---|---|---|---|
| R1 = 30.61 | D1 = 9.90 | N1 = 1.77250 | $\nu1$ = 49.6 |
| R2 = 89.05 | D2 = 3.14 | | |
| R3 = −312.89 | D3 = 4.37 | N2 = 1.72825 | $\nu2$ = 28.5 |
| R4 = 28.09 | D4 = 5.45 | | |
| R5 = 70.58 | D5 = 6.83 | N3 = 1.80610 | $\nu3$ = 40.9 |
| R6 = −59.52 | D6 = 0.56 | | |
| R7 = −123.10 | D7 = 2.18 | N4 = 1.58267 | $\nu4$ = 46.4 |
| R8 = 180.43 | D8 = 3.61 | | |
| R9 = Diaphragm-cum-Shutter (Shutter serving as Diaphragm) | | | |
| Aspheric Surface (at R3) | | | |
| a1 = 4.86071D-04, | a2 = −3.72917D-07, | a3 = 8.76563D-10, |
| a4 = −1.52559D-11, | a5 = 3.80984D-15, | |
| b1 = −7.74502D-06, | b2 = −7.22408D-08, | b3 = 3.11453D-10, |
| b4 = 1.29812D-13 | | |

Values of Factors in Conditions (5) and (6)

$$\frac{\Delta \times [0.7]}{f} = -2.52 \times 10^{-4}$$

$$\frac{\Delta \times [0.5]}{f} = -2.04 \times 10^{-4}$$

EXAMPLE 2

| | F = 100 | FNO = 1:2.8 | 2W = 62.0° | |
|---|---|---|---|---|
| R1 = 30.58 | D1 = 9.22 | N1 = 1.77250 | $\nu1$ = 49.6 |
| R2 = 109.33 | D2 = 2.92 | | |
| R3 = −231.13 | D3 = 5.71 | N2 = 1.72151 | $\nu2$ = 29.2 |
| R4 = 27.04 | D4 = 5.24 | | |
| R5 = 71.64 | D5 = 6.46 | N3 = 1.80619 | $\nu3$ = 40.9 |
| R6 = −50.49 | D6 = 0.21 | | |
| R7 = −64.69 | D7 = 3.04 | N4 = 1.58267 | $\nu4$ = 46.4 |
| R8 = 596.64 | D8 = 3.09 | | |
| R9 = Diaphragm-cum-Shutter (Shutter serving as Diaphragm) | | | |
| Aspheric Surface (at R3) | | | |
| a1 = 2.81064D-04, | a2 = −3.28454D-07, | a3 = 6.40351D-10, |
| a4 = −1.43494D-12, | a5 = −6.52655D-15, | |
| b1 = −1.23905D-07, | b2 = −6.46235D-08, | b3 = 2.43108D-13, |
| b4 = −1.63810D-13 | | |

Values of Factors in Conditions (5) and (6)

$$\frac{\Delta \times [0.7]}{f} = -1.18 \times 10^{-4}$$

$$\frac{\Delta \times [0.5]}{f} = -1.01 \times 10^{-4}$$

EXAMPLE 3

| | F = 100 | FNO = 1:2.8 | 2W = 62.0° | |
|---|---|---|---|---|
| R1 = 30.70 | D1 = 9.90 | N1 = 1.77250 | $\nu1$ = 49.6 |
| R2 = 89.98 | D2 = 4.17 | | |
| R3 = −304.58 | D3 = 4.17 | N2 = 1.72825 | $\nu2$ = 28.5 |
| R4 = 27.75 | D4 = 5.18 | | |
| R5 = 62.85 | D5 = 7.31 | N3 = 1.80610 | $\nu3$ = 40.9 |
| R6 = −59.06 | D6 = 0.55 | | |
| R7 = −123.60 | D7 = 2.14 | N4 = 1.58267 | $\nu4$ = 46.4 |
| R8 = 162.88 | D8 = 5.09 | | |
| R9 = Diaphragm-cum-Shutter (Shutter serving as Diaphragm) | | | |
| Aspheric Surface (at R3) | | | |
| a1 = 5.07584D-04, | a2 = −2.70573D-07, | a3 = 7.64905D-10, |
| a4 = −1.46700D-11, | a5 = 3.58714D-15, | |
| b1 = −8.39156D-06, | b2 = −8.92645D-08, | b3 = 3.46997D-10, |
| b4 = 8.11490D-14 | | |

Values of Factors in Conditions (5) and (6)

$$\frac{\Delta \times [0.7]}{f} = -3.66 \times 10^{-4}$$

$$\frac{\Delta \times [0.5]}{f} = -4.54 \times 10^{-4}$$

As has been described in greater detail above, according to the present invention, it becomes possible to provide a photographic lens of compact form while still permitting good stability of aberration correction throughout the extended focusing range.

What is claimed is:

1. A photographic lens comprising, from front to rear, a positive meniscus-shaped first lens unit of forward convexity, a negative second lens unit having a front surface concave toward the front, a positive bi-convex third lens unit and a negative bi-concave fourth lens unit wherein the following conditions are satisfied:

$$-3.5 < r3/f < -2.0$$

$$-1.8 < r7/f < -0.5$$

$$1.4 < r8/f < 6.5$$

$$0 < d6/f < 0.017$$

where f is the focal length of the entire system, r3 is the radius curvature of the paraxial region of the front surface of said second lens unit, r7 and r8 are the radii of curvature of the front and rear surfaces of said fourth lens unit, and d6 is the axial air space between said third and said fourth lens units when focused to infinity.

2. A photographic lens according to claim 1, wherein said second lens unit has an aspheric surface.

3. A photographic lens according to claim 2, wherein said aspherical surface is in the front surface of said second lens unit and satisfies the following conditions:

$$-5.5 \times 10^{-4} < \frac{\Delta X[0.7]}{f} < -1.0 \times 10^{-4}$$

$$-5.5 \times 10^{-4} < \frac{\Delta X[0.5]}{f} < -0.8 \times 10^{-4}$$

wherein $$\Delta X = \frac{(1/r3^*)Y^2}{1 + \sqrt{1 - (Y/r3^*)^2}} + a1Y^2 + a2Y^4 + a3Y^6 \ldots +$$

$$b1Y^3 + b2Y^5 + b3Y^7 - \frac{(1/r3)Y^2}{1 + \sqrt{1 - (Y/r3)^2}}$$

in a system of coordinates having an X-axis in the optical axis, and a Y-axis perpendicular to the optical axis, with the original point at the vertex of the lens and the direction in which light advances being taken as positive, wherein $\Delta X$ represents the difference between the aspheric surface of said second lens unit and a reference spherical surface, ai and bi are aspherical coefficients, and the radius of curvature r3 of the paraxial region of the aspheric surface is related to the radius of curvature r3* of the reference spherical surface by $$r3 = \frac{1}{\frac{1}{r3^*} + 2a1};$$

$\Delta X(0.7)$ being the value of $\Delta X$ at a height of 0.7 times the full semi-aperture; and $\Delta X(0.5)$ being the value of $\Delta X$ at a height of 0.5 times the full semi-aperture.

4. A photographic lens comprising a front lens group axially movable for focusing and including a positive meniscus lens of forward convexity, a bi-concave lens and a bi-convex lens, and a negative lens having a rear surface concave toward the rear and arranged on the image side of said front lens group, whereby as focusing is effected down to shorter object distances, the axial air separation between said front lens group and said negative lens increases.

5. A photographic lens according to claim 4, further comprising:
light restricting means arranged on the image side of said negative lens.

6. A photographic lens according to claim 5, wherein said light restricting means functions as a shutter and a diaphragm.

7. A photographic lens according to claim 4, wherein said front lens group has an aspheric surface.

8. A photographic lens according to claim 4, including
means for moving said negative lens at a slower speed than said front lens group when focusing.

9. A photographic lens according to claim 4, wherein when focusing down to shorter object distances, said negative lens first moves in unison with said front lens group and then remains stationary during the rest focusing region.

10. A photographic lens according to claim 4, wherein when focusing down to shorter object distances, said negative lens moves first at an equal speed, and then, from midway, at a slower speed than said front lens group.

* * * * *